United States Patent
Kilkki et al.

(10) Patent No.: US 6,549,514 B1
(45) Date of Patent: Apr. 15, 2003

(54) METHOD AND APPARATUS FOR SHAPING TRAFFICE FOR A SIMA NETWORK

(75) Inventors: Kalevi Kilkki, Espoo (FI); Jussi Ruutu, Espoo (FI)

(73) Assignee: Nokia Corporation, Espoo (FI)

(*) Notice: Subject to any disclaimer, the term of this patent is extended or adjusted under 35 U.S.C. 154(b) by 0 days.

(21) Appl. No.: 09/111,023

(22) Filed: Jul. 7, 1998

(51) Int. Cl.⁷ .............................. H04B 10/24; H04J 3/16
(52) U.S. Cl. .................. 370/231; 370/236; 370/416
(58) Field of Search ................ 370/229, 230, 370/231, 233, 235, 236, 232, 252, 253, 391, 389, 395, 416

(56) References Cited

U.S. PATENT DOCUMENTS

| | | | |
|---|---|---|---|
| 5,359,593 A | 10/1994 | Derby et al. | |
| 5,410,585 A | 4/1995 | Kawaharata | |
| 5,581,575 A | 12/1996 | Zehavi et al. | |
| 5,708,660 A | 1/1998 | Riedel | |
| 5,748,615 A | 5/1998 | Riedel et al. | |
| 5,768,627 A | 6/1998 | Jones et al. | |
| 5,805,577 A | 9/1998 | Jain et al. | |
| 5,805,585 A | 9/1998 | Javitt et al. | |
| 5,812,527 A | * 9/1998 | Kline et al. ................. | 370/232 |
| 6,157,614 A | * 12/2000 | Pasternak et al. ........... | 370/236 |
| 6,167,030 A | * 12/2000 | Kilkki et al. ............... | 370/236 |
| 6,205,151 B1 | * 3/2001 | Quay et al. ................. | 370/416 |
| 6,229,788 B1 | * 5/2001 | Graves et al. .............. | 370/230 |

FOREIGN PATENT DOCUMENTS

| | | |
|---|---|---|
| EP | 0767595 A1 | 4/1997 |
| WO | WO 96/27965 | 9/1996 |

OTHER PUBLICATIONS

Reiss, L. K. et al., "Priority Shaping Of Source Traffic for ATM Networks", Proceedings of the IEEE International Conference on Communications (ICC), Geneva, May 23–26, 1993, vol. 2, May 23, 1998, pp. 671–675, XP00371171.

(List continued on next page.)

*Primary Examiner*—Alpus H. Hsu
*Assistant Examiner*—Afsar M. Qureshi
(74) *Attorney, Agent, or Firm*—Squire, Sanders & Dempsey L.L.P.

(57) ABSTRACT

A SIMA Traffic Shaper (STS) and method is disclosed for use between the customer equipment and the SIMA access node to shape the transmitted traffic so that the cells will receive as good priority as possible in the access node. The STS includes an input device for receiving cells from a traffic source, a buffering device, coupled to the input, for holding the cells until instructed to send the cells; and a calculation unit, operatively coupled to the buffer processor, for calculating a send time for sending cells held by the buffering device. The buffering device further includes a buffer and a transmission unit, wherein the buffer holds the cells and the transmission unit sends the cell forward according to the send time received from the calculation unit. A monitoring unit is included for monitoring the input device and the buffering device to obtain loading information regarding the network. The calculation unit calculates the send time based upon a nominal bit rate, a maximum delay, the loading information provided by the monitoring unit and a monitoring principle. The monitoring principle may be based solely upon a number of segments containing cells in the buffer or on the loading information.

39 Claims, 6 Drawing Sheets

OTHER PUBLICATIONS

"ATM Lecture", Internet http://syllabus.syr.edu/1st/Mweschen/1st656/Week4/lecture/atm.atm.htm, pp. 1–5 (Feb. 6, 1997).

"Integrated Services Digital Network (ISDN) Overall Network Aspects and Functions, Traffic Control and Congestion Control in B–ISDN", International Telecommunication Union, ITU–T Recommendation I.371, pp. 1–27 (Mar. 1993).

Giroux, N., "Technical Committee, Traffic Management Specification", ATM Forum, Version 4.0, af–tm–0056.000, pp. 1–59 (Apr. 1996).

Kessler, G., "An Overview of ATM Technology", ATM Overview, pp. 1–10 (Jan. 1995).

Lambarelli, L., "ATM Service Categories: The Benefits to the User", The ATM Forum: White Paper on Service Categories, pp. 1–10 (date unknown).

Symborski, C., "What are the meaning of CBR, VBR, ABR, UBR?", Maintained by Carl Symborski, (Last Changed Aug. 20, 1996) pp. 1–2.

Yao, E. "The ATM—The New Technology for Tomorrow's B–ISDN", pp. 1–23 (Dec. 1994).

* cited by examiner

METHOD AND APPARATUS FOR SHAPING TRAFFIC FOR A SIMA NETWORK

BACKGROUND OF THE INVENTION

1. Field of the Invention

This invention relates in general to a network communications, and more particularly to a method and apparatus for shaping traffic for a SIMA network.

2. Description of Related Art

The state of communications technology, particularly that which affects the Internet, is currently in flux and subject to rapid and often uncoordinated growth. The ubiquity and diversity of personal computers and set-top boxes has placed significant pressure on the providers of communications system infrastructure to accommodate the alarming increase in the number of new users that demand immediate access to Internet and other network resources. The rapid development of new and sophisticated software made available to users of such services places additional demands on system infrastructure.

Conducting commerce over the Internet and other networks is a practice that is gaining acceptance and popularity. By way of example, traditional on-line services, such as those offered by Internet providers, typically charge customers a monthly fee for access to basic services and resources, such as proprietary and public databases of information. Such traditional service providers also advertise any number of products or services which are purchasable on-line by the user.

Other forms of Internet commercialization currently being considered or implemented include offering of video and audio conferencing services, and a variety of other real-time and non-real-time services. The providers of these services, as well as the providers of communications system infrastructure, are currently facing a number of complex issues, including management of network capacity, load, and traffic to support real-time, non-real-time, and high-bandwidth services, and implementing a viable billing scheme that accounts for the use of such services.

The communications industry is expending considerable attention and investment on high speed solutions including gigabit networking. For example, one particular technology is referred to as asynchronous transfer mode (ATM). Those skilled in the art understand ATM to constitute a communications networking concept that can provide a capability to manage increases in network load, support both real-time and non-real-time applications, and offer, in certain circumstances, a guaranteed level of service quality.

A conventional ATM service architecture typically provides a number of predefined quality of service classes, often referred to as service categories. Each of the service categories includes a number of quality of service (QoS) parameters which define the nature of the respective service category. In other words, a specified service category provides performance to an ATM virtual connection (VCC or VPC) in a manner specified by a subset of the ATM performance parameters. The service categories defined in the ATM Forum specification reference hereinbelow include, for example, a constant bit rate (CBR) category, a real-time variable bit rate (rt-VBR) category, a non-real-time variable bit rate (nrt-VBR) category, an unspecified bit rate (UBR) category, and an available bit rate (ABR) category.

The constant bit rate service class is intended to support real-time applications that require a fixed quantity of bandwidth during the existence of the connection. A particular quality of service is negotiated to provide the CBR service, where the QoS parameters include characterization of the peak cell rate (PCR), the cell loss rate (CLR), the cell transfer delay (CTD), and the cell delay variation (CDV). Conventional ATM traffic management schemes guarantee that the user-contracted QoS is maintained in order to support, for example, real-time applications, such as circuit emulation and voice/video applications, which require tightly constrained delay variations.

The non-real-time VBR service class is intended to support non-real-time applications, where the resulting network traffic can be characterized as having frequent data bursts. Similarly, the real-time variable bit rate service category may be used to support "bursty" network traffic conditions. The rt-VBR service category differs from the nrt-VBR service category in that the former is intended to support real-time applications, such as voice and video applications. Both the real-time and non-real-time VBR service categories are characterized in terms of a peak cell rate (PCR), a sustainable cell rate (SCR), and a maximum burst size (MBS).

The unspecified bit rate (UBR) service category is often regarded as a "best effort service," in that it does not specify traffic-related service guarantees. As such, the UBR service category is intended to support non-real-time applications, including traditional computer communications applications such as file transfers and e-mail.

The available bit rate (ABR) service category provides for the allocation of available bandwidth to users by controlling the rate of traffic through use of a feedback mechanism. The feedback mechanism permits cell transmission rates to be varied in an effort to control or avoid traffic congestion, and to more effectively utilize available bandwidth. A resource management (RM) cell precedes the transmission of data cells, which is transmitted from source to destination and back to the source, in order to provide traffic information to the source.

Although the current ATM service architecture described above would appear to provide, at least at a conceptual level, viable solutions to the many problems facing the communications industry, ATM, as currently defined, requires implementation of a complex traffic management scheme in order meet the objectives articulated in the various ATM specifications and recommendations currently being considered. In order to effectively manage traffic flow in a network, conventional ATM traffic management schemes must assess a prodigious number of traffic condition indicators, including service class parameters, traffic parameters, quality of service parameters and the like. A non-exhaustive listing of such parameters and other ATM traffic management considerations is provided in ITU-T Recommendation I.371, entitled Traffic Control and Congestion Control in B-ISDN, and in Traffic Management Specification, version 4.0 (af-tm-0056.000, April 1996), published by the Technical Committee of the ATM Forum.

Nevertheless, ATM is the current technology of choice when quality of service guarantees are critical. Still, Gigabit Ethernet is simpler, and a less expensive alternative in LAN environments where it is often more expedient to overbuild network capacity. Regardless of the technology, the increased bandwidth improved flow control is necessary in the developing high speed networks to prevent traffic loss.

Simple Integrated Media Access (SIMA) is a new way to introduce new properties for packet based data networks, such as TCP/IP or ATM networks. According to the SIMA concept each customer shall define only two issues before a connection establishment: a nominal bit rate (NBR) and the selection between real-time and non-real-time service classes. application Ser. No. 08/821,273, entitled "NOMINAL BIT RATE NETWORK SERVICE," filed on Mar. 20, 1997 by K. Kilkki, assigned to the assignee of this application, and which is incorporated by reference herein, provides greater details of a SIMA network.

NBR forms the basis of charging, and it defines how the network capacity is divided among different connections during overload situations. Simplicity of SIMA means that, on the one hand, the network operator does not guarantee the continuous availability of nominal bit rate, and on the other hand, the user is allowed to send data with any bit rate independently of the NBR.

The primary idea of the SIMA service is to maximize the exploitation of network resources with a simple control scheme while keeping the ratios of QoS levels offered to different flows unchanged under changeable traffic conditions. The maximization is based on three key features: all flows with different QoS requirements share the total capacity of every link, the network attempts to avoid any unnecessary packet discarding, and flow (or call) level blocking can be totally avoided. The approximate constancy of QoS ratios and simplicity are achieved by using 8 priority levels which make possible a fair packet discarding scheme inside the network without keeping track on the traffic of every flow.

The total SIMA service requested by a user consists of a nominal bit rate and of a possible real-time service request. This half of the service is as clear and reasonable as possible. The other half of the service is the expected QoS of the flow, or actually, the expected QoS of the application that the customer uses over the SIMA network. An essential issue for the success of the SIMA service is how reasonable and acceptable this part of the service concept will be.

Most customers have experienced circuit switched networks (like telephone networks) and packet networks with best-effort service (like the current Internet). In a circuit switched network a busy period means that the call blocking probability increases. In packet networks the packet loss ratio increases during busy periods, and effectively, the available capacity for a flow decreases if a TCP/IP type of protocol is used. In a SIMA environment; when a user buys a NBR for a flow and then sends traffic into a SIMA network, there is usually no flow level blocking (although it is possible to protect the SIMA network from excessive overloads by restricting the total sum of NBRs). The quality of the flow depends on two issues: the NBR to actual bit rate ratio, and total load in the network. Therefore, a potential difficulty is that the customer cannot precisely know what the QoS of a flow will be because rapid traffic variations may bring about unexpected changes of QoS (however, even in the case of services using resource reservation the actual quality of flows using certain quality class may vary significantly, because the quality can only be determined by using statistical parameters).

Because the quality of existing flows is not in the same way predictable as with services using complicated resource reservation mechanism, the SIMA network shall be implemented in a way that the users can rely on the fairness of the service. The fairness of the SIMA service is based on the fact that all flows with the same actual bit rate to NBR ratio perceives similar QoS. Thus, a home user with 10 kbit/s NBR receives the same QoS as a large company with NBR of 100 Mbit/s provided that both are transmitting at their own NBR. The SIMA service can offer this fairness feature during a short interval. In contrast, during a long period, like a month, fairness is not as clear, because the amount of transferred information depends essentially on total length of active periods, whereas the charging does not depend on the customer's activity. This fairness problem common to any service with flat-rate charging can be solved, if needed, by using a time dependent charging.

Another aspect of fairness is the possibility to obtain more quality with higher price or lower price with less quality by changing the actual bit rate or NBR. This means that each customer is entitled. to change the NBR to actual bit rate ratio and by that means to optimize his/her quality to charge ratio. If the ratio increases, the quality of the flow is enhanced. If the user sends traffic by using a constant bit rate, the SIMA service offers 7 different quality levels (for variable bit rate traffic the levels are less distinct but basically the same). Although the absolute quality of each priority level depends on the network dimensioning and on actual traffic process, the quality levels provided by SIMA are arranged in seven priority levels.

First, there is priority level 7. Priority level 7 is reserved for non-SIMA. services with resource reservation. Then, there is priority level 6. Priority level 6 is dedicated to providing excellent quality and negligible packet loss ratios. Priority level 5 is for high quality transmission, wherein packet losses are allowed only during exceptional traffic peaks. Priority level 4 is for good quality transmissions, wherein small packet loss ratios are provided—even during busy hour. Priority level 3 is for moderate quality transmissions, wherein small packet loss ratios are usually provided except during busy hours. Priority level 2 is for satisfactory quality, wherein very high packet loss ratios are allowed from time to time. Priority level 1 is suitable for best-effort traffic during busy hour. Finally, priority level 0 is a service that is unusable during busy hour, but which is suitable for best-effort traffic during non-busy hours.

Thus, every data packet is equipped with a priority level (PL) that can be an integer between 0 and 7. This priority is used for selecting packets that are discarded during congestion of a network node. The priority is determined from the ratio of momentary actual bit rate of the source to the nominal bit rate (NBR) assigned to the source. This task is performed in a network access node that is the first network element to receive a packet from the customer equipment. Notice that a NBR can be, for example, assigned to a physical link, a user or a flow of single application. Below we use the term "connection" for meaning one entity (i.e. link, user, application) that has its own NBR.

The problem is that current applications cannot fully utilize the properties of SIMA network as they do not have any knowledge about SIMA. This may lead to a situation in which the application gets unnecessarily low priorities for it's packets in the SIMA network. For example, an application with non-real-time data may transmit data packets as fast as it can even though there is no real need for this. As a result, the priority level that the packets receive at the access node is low and the connection looks must worse than could be expected from NBR.

One straightforward solution is to modify the application program so that it decreases its transmission rate. However, this is most inconvenient since the number of applications is huge.

It can be seen then that there is a need for a more sophisticated method and apparatus for shaping traffic in a SIMA network so that packet delivery is not adversely affected by the SIMA network.

It can also be seen that there is a need for a SIMA Traffic Shaper (STS) and method that is used between the customer equipment and the SIMA access node to shape the transmitted traffic so that the packets will receive as good priority as possible in the access node.

SUMMARY OF THE INVENTION

To overcome the limitations in the prior art described above, and to overcome other limitations that will become apparent upon reading and understanding the present specification, the present invention discloses a method and apparatus for shaping traffic for a SIMA network.

The present invention solves the above-described problems by providing a SIMA Traffic Shaper (STS) and method that is used between the customer equipment and the SIMA access node to shape the transmitted traffic so that the packets will receive as good priority as possible in the access node.

A system in accordance with the principles of the present invention includes an input device for receiving packets from a traffic source, a buffering device, coupled to the input, for holding the packets until instructed to send the packets; and a calculation unit, operatively coupled to the buffer processor, for calculating a send time for sending packets held by the buffering device.

Other embodiments of a system in accordance with the principles of the invention may include alternative or optional additional aspects. One such aspect of the present invention is that the buffering device further comprises a buffer and a transmission unit, the buffer holding the packets and the transmission unit sending the packet forward according to the send time received from the calculation unit.

Another aspect of the present invention is that the system further includes a monitoring unit for monitoring the input device and the buffering device to obtain loading information regarding the network.

Another aspect of the present invention is that the calculation unit calculates the send time based upon a nominal bit rate, a maximum delay, the loading information provided by the monitoring unit and a monitoring principle.

Another aspect of the present invention is that the buffer comprises segments for holding the packets, and wherein the monitoring principle is based solely upon a number of segments containing packets in the buffer.

Another aspect of the present invention is that the calculation unit determines a transmission rate for sending the packets, the transmission rate being equal to:

$$\frac{\sqrt{2}\,NBR}{2^{k-4}}$$

where k is the number of a segment up to which the buffer is filled and NBR is the nominal bit rate.

Another aspect of the present invention is that the maximum delay is:

$$D^*_{max}(y) = \frac{X \cdot \sum_{k=0}^{7} y(k) \cdot N(k)}{C_{link}},$$

where y is the number of cells in a segment, $C_{link}$ is the link rate, k is the number of a segment up to which the buffer is filled and N(k) is the priority level, and wherein $D^*_{max}(Y) \leq D_{max}$.

Another aspect of the present invention is that the buffer comprises segments for holding the packets, and wherein the monitoring principle is based on the loading information.

Another aspect of the present invention is that the calculation unit calculates a transmission interval between successive cells based on instantaneous bit rate at the arrival time of a $j_{th}$ packet, the nominal bit rate and the link rate.

Another aspect of the present invention is that the transmission interval between successive cells is calculated according to:

$$N*(j) = \frac{C_{link}}{IBR(j)}$$

where IBR(j) is the instantaneous bit rate of the $j_{th}$ cell, NBR is the nominal bit rate and $C_{link}$ is the link rate.

Another aspect of the present invention is that the calculating unit calculates a list of optimum transmission intervals for a plurality of priority levels and selects a final transmission interval based on the loading information such that $N_m(j)$ is equal to the largest N(k) smaller than or equal to $N*(j)$, where $N_m(j)$ is the final transmission interval, N(k) is the transmission interval for priority level k, and $N*(j)$ is the transmission interval for the $j_{th}$ packet.

Another aspect of the present invention is that the list of optimum transmission interval for each priority level k is calculated according to:

$$N(k) = Int\left(\frac{C_{link} \cdot 2^{k-4}}{\sqrt{2}\,NBR}\right) + 1.$$

Another aspect of the present invention is that the calculating unit further calculates a transmission interval $N_d(j)$ that takes into account the maximum delay according to:

$$N_d(j) = \min\left(int\left(\frac{C_{link} \cdot D_{max}}{X \cdot M(j)}\right), N_d(j-1)\right),$$

where X is the fixed packet or cell size in bits, M(j) is the number of cells in the buffer at the arrival or $j^{th}$ packet or cell, $D_{max}$ is the maximum delay and $C_{link}$ is the link rate.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a SIMA Traffic Shaper (STS) and method that is used between the customer equipment and the SIMA access node so that the packets will receive as good priority as possible in the SIMA network. The STS includes buffers to shape the transmitted traffic.

Figure 1:
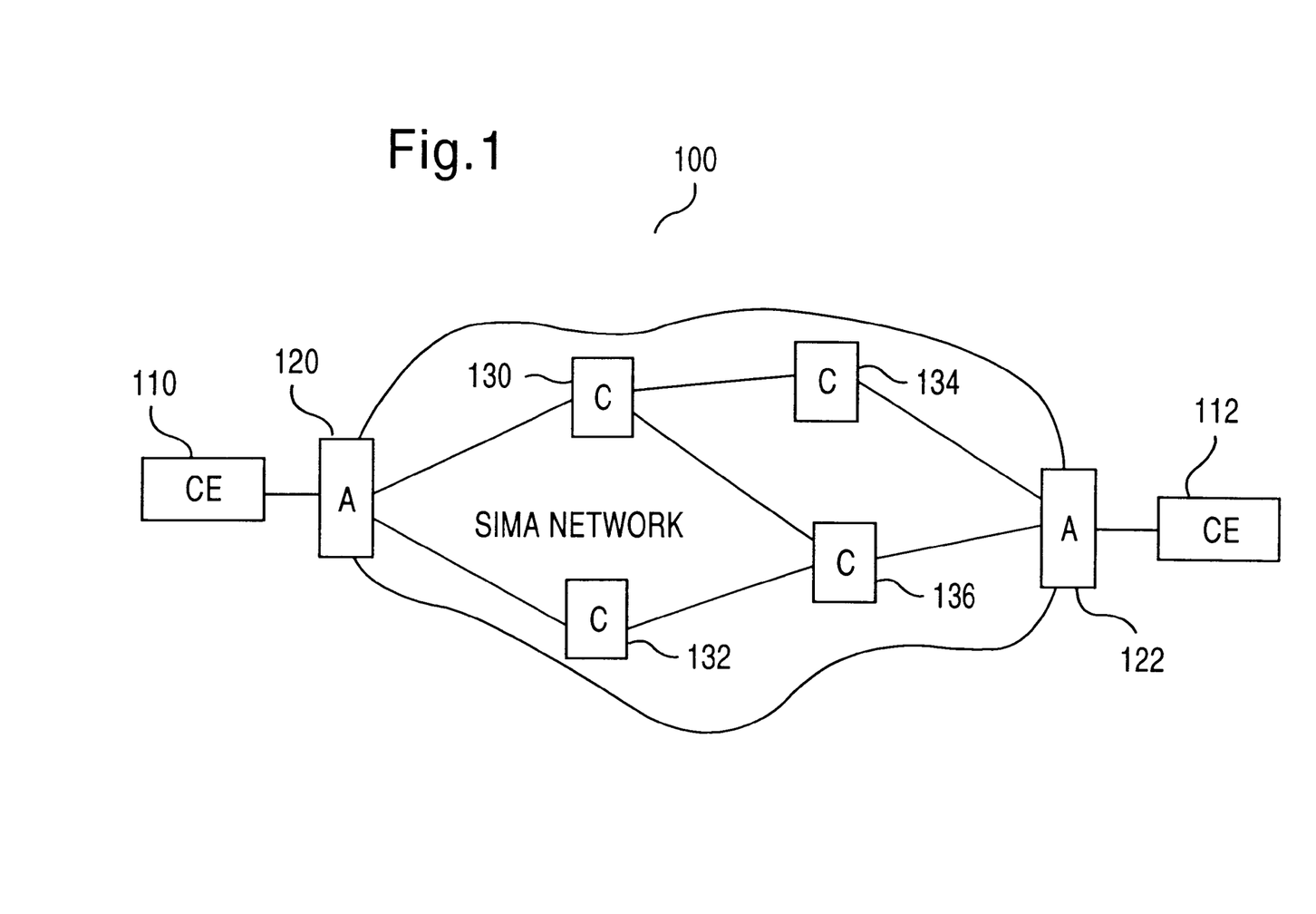
FIG. 1 illustrates a SIMA network.

FIG. 1 illustrates a SIMA network 100. In FIG. 1., the SIMA network 100 is shown to include customer equipment (CE) 110 connected to an other customer equipment (CE) 112 through a SIMA network with access nodes (A) 120, 122 and core nodes (C) 130, 132, 134, 136. Thus, the implementation of the SIMA service consists of two main parts: access nodes 120, 122 and core network nodes 130, 132, 134, 136. However, there is a fundamental difference between the node types: the traffic measurement of every flow is performed at access nodes 120, 122 whereas at the core network nodes 130, 132, 134, 136, the traffic control functions do not need to know anything about the properties of separate flows.

There are two main alternatives for the realization of the SIMA service: the first one based purely on packet network and the second one based on the use of ATM for the switching and transportation. As the basic implementation of these two alternatives do not differ considerably from each other, the main difference is that ATM makes possible to realize more easily a satisfactory real-time service.

Figure 2:
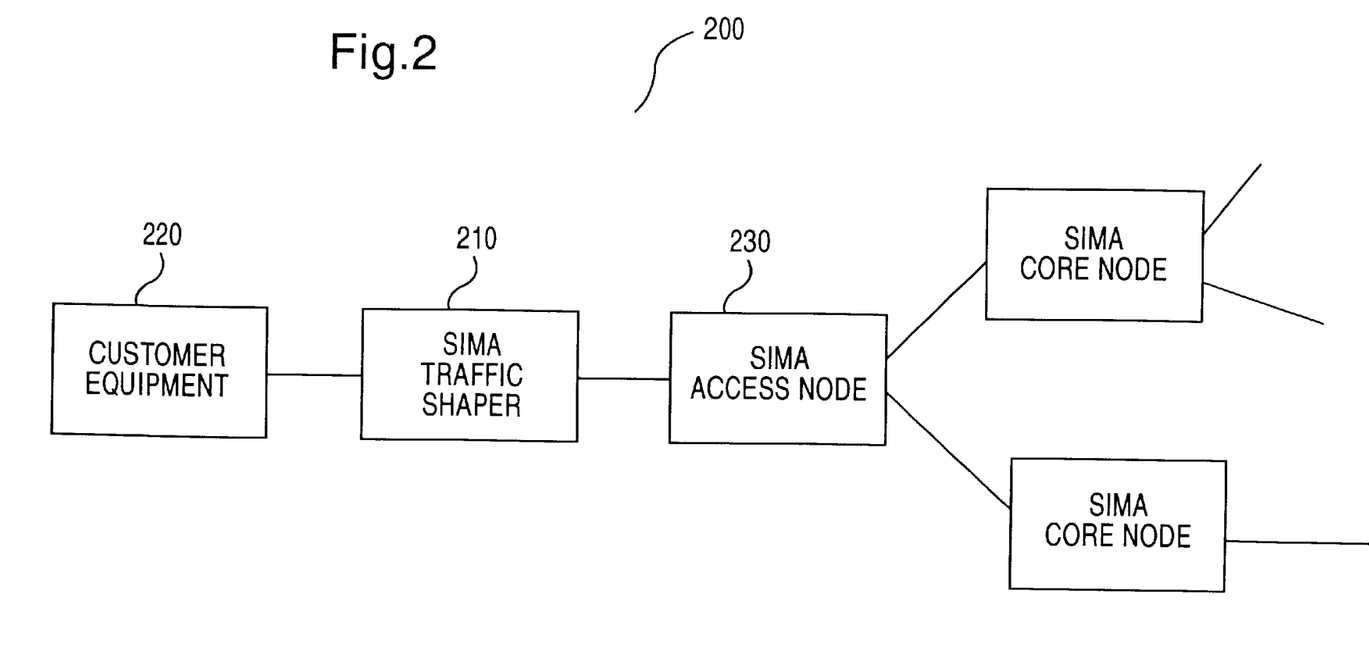
FIG. 2 illustrates a SIMA network including a traffic shaper (STS) for ensuring that packets receive as good priority as possible in the SIMA network.

FIG. 2 illustrates a SIMA network 200 including a traffic shaper (STS) 210 for ensuring that packets receive as good priority as possible in the SIMA network. The STS 210 is placed between the actual traffic source 220 and the SIMA access node 230. The STS 210 can be, for example, a device used together with the applications program in the customer equipment 220. In this case STS 210 is completely controlled and maintained by the customer. A second possibility is to install STS 210 next to the access node 230 so that it is maintained by the operator. In this case STS is an extra service provided by the operator. Those skilled in the art will recognize that the invention is not limited by the exact implementation, but that the invention need only function between the actual traffic source 220 and the SIMA access node 230.

Figure 3:
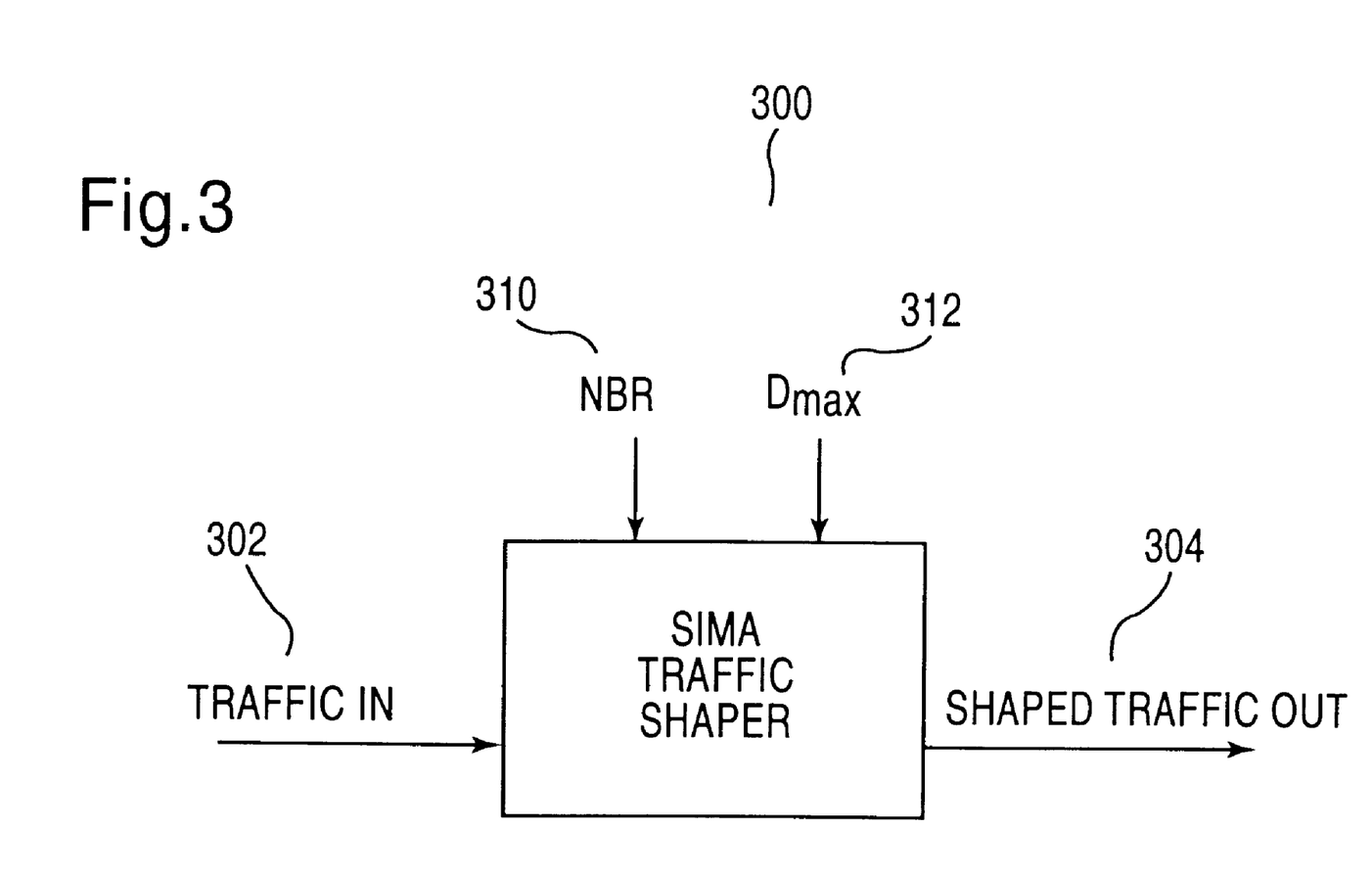
FIG. 3 illustrates a SIMA traffic shaper (STS) device according to the present invention.

FIG. 3 illustrates a SIMA traffic shaper (STS) device 300 according to the present invention. The purpose of STS 300 is to take traffic input 302 and shape it so that the outgoing, shaped traffic 304 obtains as good priority as possible in the access node of SIMA network. The input for the STS unit 300 consists of a signal for the Nominal Bit Rate of the connection (NBR) 310 and a maximum delay signal 312 indicating the maximum delay allowed from the input to the output of the device ($D_{max}$). According to the present invention, there should be one STS 300 for one entity having its own NBR.

Thus, the STS 300 may be for the physical link that has its own NBR, e.g. as illustrated by the STS 210 in FIG. 2. If there are several users with their own NBR using the same physical link, then each user can have their own STS 300. Finally, if a single user uses several applications, that have their own NBRs, then a STS 300 is needed for each flow of an application. Naturally, the physical STS 300 can contain several traffic shaper functionalities for each user and application.

In FIG. 3, the NBR signal 310 can be the value assigned to the connection. However, it is possible to use a NBR 310 for the STS 300 that differs from the official NBR used in the SIMA access node. The maximum delay $D_{max}$ 312 is a value that depends on the time sensitivity of the traffic. The maximum delay $D_{max}$ 312 sets the maximum time that a data packet stays inside STS 300. Generally, the longer the maximum delay $D_{max}$ 312, the better chance the STS 300 will have for shaping the traffic.

Figure 4:
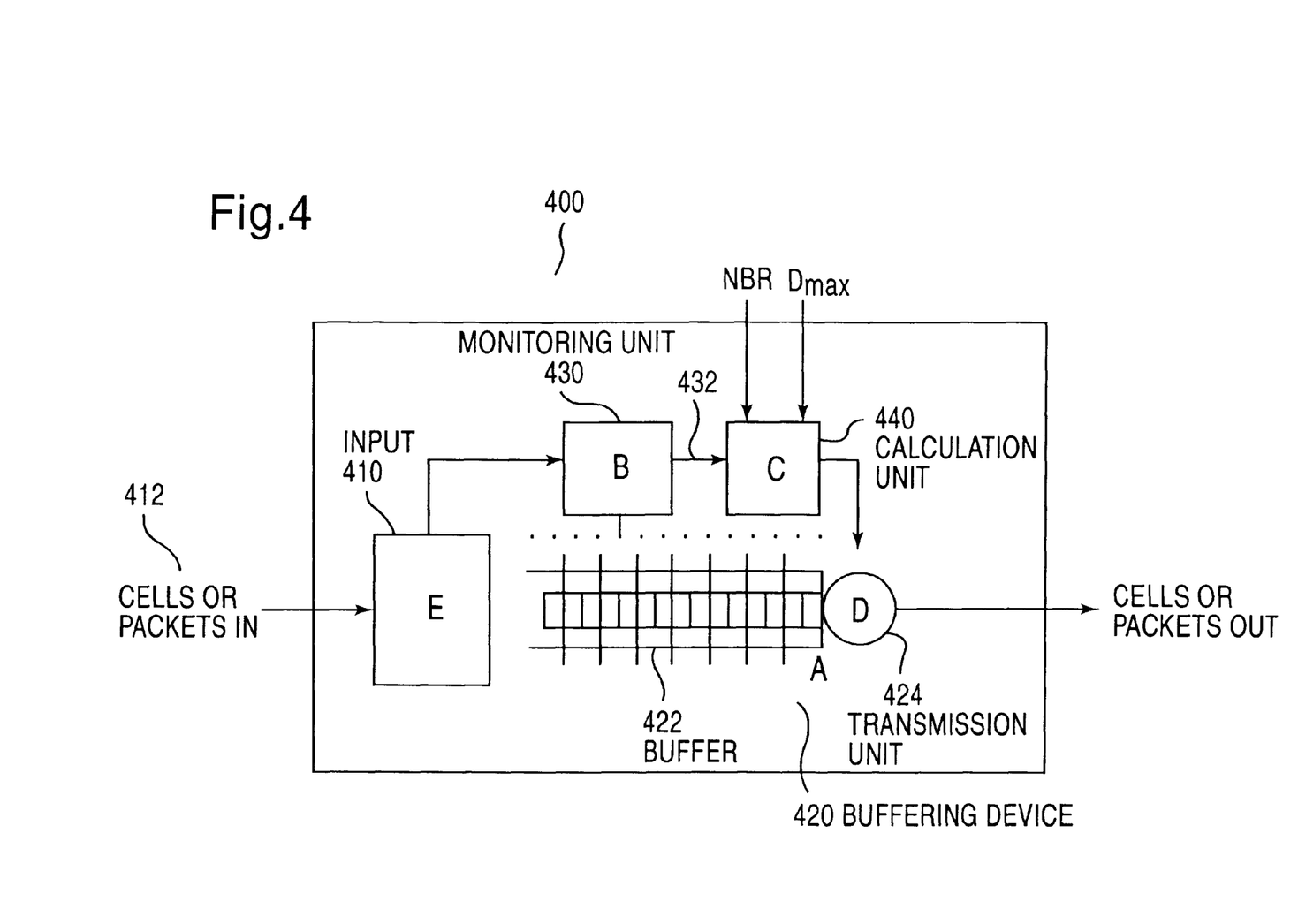
FIG. 4 illustrates the internal structure of the SIMA traffic shaper device.

The internal structure of the SIMA traffic shaper device 400 is illustrated in FIG. 4. The device 400 has five main elements. The first element is the input 410 for the device that receives cells or packets 412. A buffering device 420 holds the packets 412 until instructed to resend the packets 412. A monitoring unit 430 monitors the load level of the unit 400. Then, a calculation unit 440, e.g., a processor, determines the time of cell or packet transmission. The buffering device includes a buffer 422 and a transmission unit 424. The transmission unit 424 sends the cells or packets held in the buffer 422 forward according to the transmission time calculated by the calculation unit 440.

The STS device 400 receives data packets or ATM cells 412 through the input 410 of the device 400. The incoming packet 412 is situated in the buffer 422. The monitoring unit 430 monitors the load situation in unit 400 based on the information obtained from the input unit 410 and the buffer 422. The monitoring result 432 is transferred to the calculation unit 440. The calculation unit 440 than determines, according to an algorithm, which is the sending time of the next cell or packet in the buffer, and gives this information to the sending unit 424. The calculation is based on four parameters: the traffic load situation, Nominal Bit Rate, the maximum delay and link rate. The sending unit 450 then transmits the first cell or packet in the buffer at the instant directed by the calculation unit 440.

Two embodiments of monitoring principles for implementing the STS will now be described. The first implementation is based purely on the buffer occupancy level. The second implementation relies mainly on a load measurement result. Those skilled in the art will understand that the examples are provided for illustration only, and that other embodiments within the spirit and scope of the present invention are possible.

Figure 5:
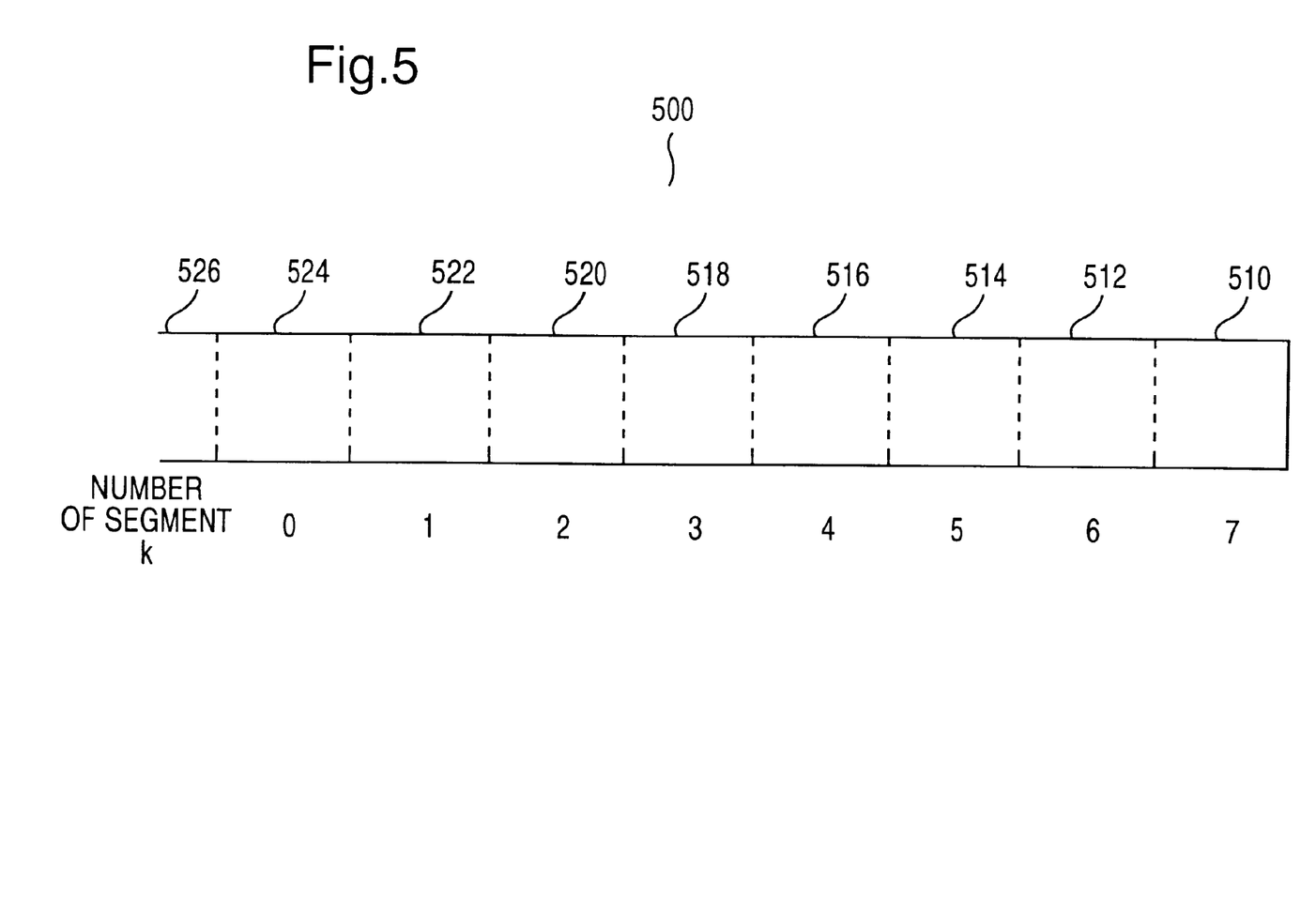
FIG. 5 illustrates a buffer using different segments according to the present invention.

The first implementation example is based on the idea that the STS takes in cells or packets and places them to a buffer. FIG. 5 illustrates a buffer 500 using different segments 510–526 according to the present invention. The buffer 500 is emptied at one of eight rates that correspond to different priority levels at the access node. The transmission rate is controlled by the occupancy level of the buffer, and with increasing occupancy the transmission rate increases.

Here it is assumed that the device can buffer several packets or cells without violating the delay constraint. The FIFO buffer 500 is divided into 8 segments 510–526. The idea is that the transmission rate out of buffer 500 depends on the segment up to which the buffer is filled. Notice that the occupancy of the buffer increases with the decreasing k. Thus, the segment number k also indicates the number of unused segments in the buffer.

For example, when the packets or cells fill the buffer up to segment 4 516, the buffer 500 is emptied at the rate √2NBR. At segment 5 514 the rate is halved, at the segment 3 518 the rate is doubled. Thus, the rate is:

$$r = \frac{\sqrt{2}\,NBR}{2^{k-4}} \quad (1)$$

where k is the number of the segment. Notice that k is also the priority level that the packet is assumed to obtain at the access node. Transmission rate r is close to the maximum rate that allows still priority level k at the access node. Effectively, this kind of buffer filters out fast changes in the transmission rate of the source.

If the transmission rate is constant, the priority level PL(j) can be calculated using the following equation:

$$x = 4.5 - \ln\left(\frac{IBR(j)}{NBR}\right) / \ln(2) \quad (2)$$

$$PL(j) = \begin{cases} 6 & \text{if } x \geq 6 \\ Int(x) & \text{if } 0 < x < 6 \\ 0 & \text{if } x \leq 0 \end{cases}$$

where Int(x) is the integer part of x, NBR is the Nominal Bit Rate of the connection and IBR(j) is the Instantaneous Bit Rate at the arrival time of $j^{th}$ packet.

Because of the granularity of equation (2), the instantaneous transmission rate can be optimized in a way that the delay of the packet is minimized while keeping priority level, defined by equation (2), unchanged. In case of ATM, or any network with fixed packet size, the optimum number of timeslots between successive ATM cells for priority level k is:

$$N(k) = Int\left(\frac{C_{link} \cdot 2^{k-4}}{\sqrt{2} \cdot NBR}\right) + 1 \text{ for } k = 1 \ldots 6, \quad (3)$$

where $C_{link}$ is the link rate. If the lowest priority level is needed, the cells or packets can be transmitted in successive timeslots and therefore N(0)=1, since there is no priority impairment if N(0)=1 is used instead of applying equation (2).

The maximum delay can be calculated based on the values of N(k) and the size of each segment. If we suppose that every segment contains fixed capacity, let say, y cells, the maximum delay can be calculated as follows:

$$D^*_{max}(y) = \frac{X \cdot y \cdot \sum_{k=0}^{7} N(k)}{C_{link}} \quad (4)$$

where X is the fixed packet or cell size in bits. Furthermore, y can depend k, in which case we the following modified formulae:

$$D^*_{max}(y) = \frac{X \cdot \sum_{k=0}^{7} y(k) \cdot N(k)}{C_{link}} \quad (5)$$

Now, in order to meet the delay requirement $D_{max}$, y must be the maximum integer which fulfills the condition:

$$D^*_{max}(y) \leq D_{max} \quad (6)$$

This alternative is applicable provided that y is at least 1, and preferable at least 2. If y must be 0 a different approach should be applied.

The second implementation is therefore intended for situations in which the delay requirement is so short that the first implementation described above cannot be used. However, those skilled in the art will recognize that there are no restrictions in using this option with long delays as well.

If $D_{max}$ is very short, the monitoring unit cannot utilize the monitoring principle based purely on the buffer occupancy level as in the first implementation discussed above. Instead, the second implementation relies mainly on a load measurement result. For example, assume that the load measurement result at the arrival of $j^{th}$ packet is IBR(j). The measurement can apply, for instance, the principle of exponential moving average.

The calculation unit calculates the transmission interval between successive cells based on IBR(j), NBR and $C_{link}$:

$$N*(j) = \frac{C_{link}}{IBR(j)}$$

In order to optimize the time between cells or packets, the calculating, unit shall have list of optimum N for each priority level k:

$$N(k) = Int\left(\frac{C_{link} \cdot 2^{k-4}}{\sqrt{2} \cdot NBR}\right) + 1$$

Now the final N(j) based on the traffic measurement result is:

$N_m(j)$=the largest N(k) smaller than or equal to N*(j)

In addition, the maximum delay shall be taking into account. The following simple algorithm can be used for this purpose. In addition to the $N_m(j)$ the STS device has another variable $N_d(j)$, which is updated at the arrival of every packet (j):

$$N_d(j) = \min\left(int\left(\frac{C_{link} \cdot D_{max}}{X \cdot M(j)}\right), N_d(j-1)\right),$$

where X is the fixed packet or cell size in bits, and M(j) is the number of cells in the buffer at the arrival or $j^{th}$ packet or cell. In addition, always when the buffer is emptied, the value of $N_d(j)$ will be updated:

$$N_d(j) = int\left(\frac{C_{link} \cdot D_{max}}{X}\right)$$

Finally, the calculation units selects the smaller of the $N_m(j)$ and $N_d(j)$ and sends that value to the sending unit D.

Figure 6:
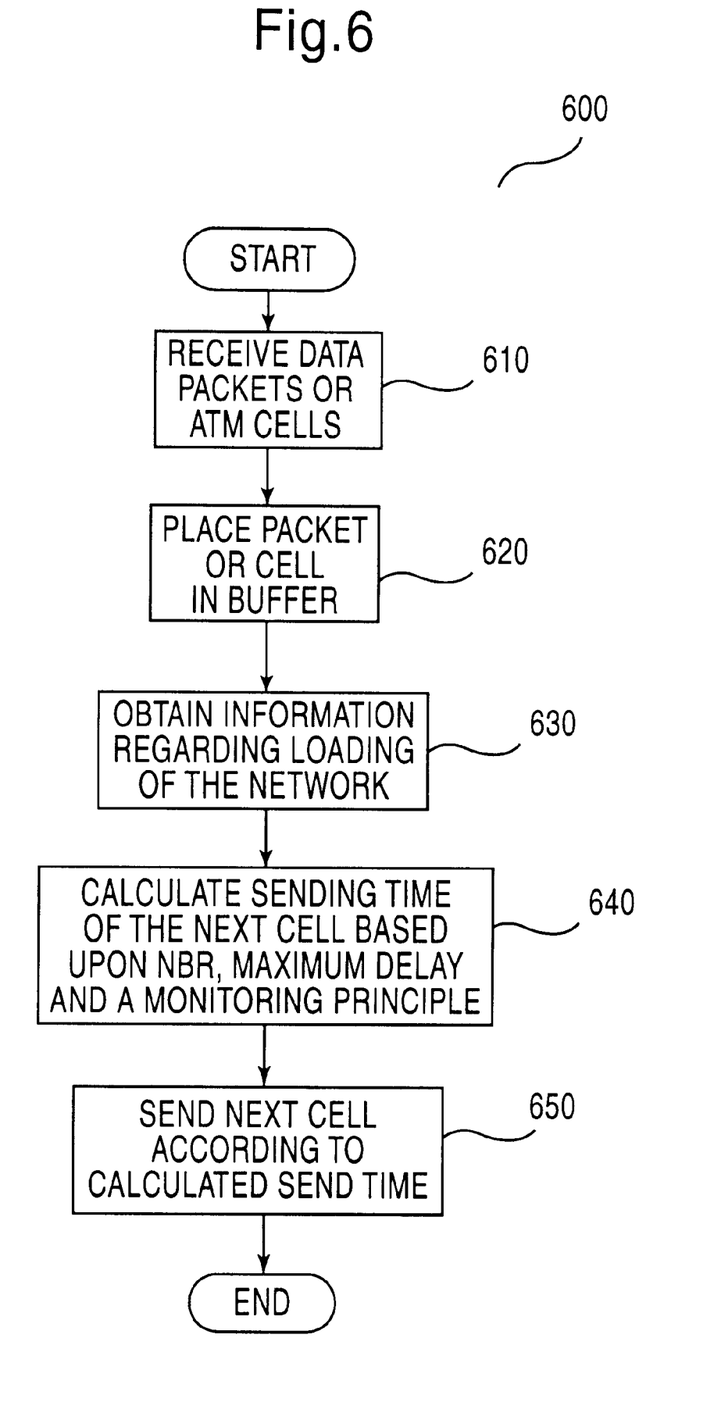
FIG. 6 illustrates a flow chart of the traffic shaping method 600.

FIG. 6 illustrates a flow chart of the traffic shaping method 600. First, the STS device receives data packets or ATM cells through the input of the device 610. The incoming packet are loaded into a buffer 620. Then, information regarding the loading of the network is obtained 630. The sending time of the next cell or packet is then calculated 640. The sending time is calculated based upon the NBR, the maximum delay and a monitoring principle. As described above, the monitoring principle may rely, for example, on the buffer occupancy level or on a load measurement result. Finally, the next cell or packet is sent according to the calculated send time 650.

In summary, the present invention provides a method and apparatus for shaping traffic in a SIMA network. For this purpose, a SIMA Traffic Shaper (STS) is used between the customer equipment and the SIMA access node. By using buffers, the STS is able to shape the transmitted traffic so that the packets will receive as good priority as possible in the access node. Those skilled in the art will recognize that the invention is not meant to be limited to a particular technology such as IP or ATM networks, in that the main difference between ATM and IP, as regards a SIMA network, is that ATM has fixed size packets while the size of IP packets can vary.

The foregoing description of the exemplary embodiment of the invention has been presented for the purposes of illustration and description. It is not intended to precise form disclosed. Many modifications and variations are possible in light of the above teaching. It is intended that the scope of the invention be limited not with this detailed description, but rather by the claims appended hereto.

What is claimed is:

1. A traffic shaper for a network, comprising:
an input device for receiving cells from a traffic source;
a buffering device, coupled to the input, for holding the cells until instructed to send the cells; and
a calculation unit, operatively coupled to the buffer processor, for calculating a send time for sending cells held by the buffering device, wherein the send time optimizes a transmission interval between successive cells to obtain a maximum priority level, the transmission interval between successive cells being based on instantaneous bit rate at the arrival time of a $j_{th}$ cell, a nominal bit rate and a link rate.

2. The traffic shaper of claim 1 wherein the buffering device further comprises a buffer and a transmission unit, the buffer holding the cells and the transmission unit sending the cell forward according to the send time received from the calculation unit.

3. The traffic shaper of claim 2 further comprising a monitoring unit for monitoring the input device and the buffering device to obtain loading information regarding the network.

4. The traffic shaper of claim 3 wherein the calculation unit calculates the send time based upon the nominal bit rate, a maximum delay, the loading information provided by the monitoring unit and a monitoring principle.

5. The traffic shaper of claim 4 wherein the buffer comprises segments for holding the cells, and wherein the monitoring principle is based solely upon a number of segments containing cells in the buffer.

6. The traffic shaper of claim 5 wherein the calculation unit determines a transmission rate for sending the cells, the transmission rate being equal to:

$$\frac{\sqrt{2}\, NBR}{2^{k-4}}$$

where k is the number of a segment up to which the buffer is filled and NBR is the nominal bit rate.

7. The traffic shaper of claim 6 wherein the maximum delay is:

$$D^*_{max}(y) = \frac{X \cdot \sum_{k=0}^{7} y(k) \cdot N(k)}{C_{link}},$$

where y is the number of cells in a segment, $C_{link}$ is the link rate, k is the number of a segment up to which the buffer is filled and N(k) is the priority level, and wherein $D^*_{max}(y) \leq D_{max}$.

8. The traffic shaper of claim 4 wherein the buffer comprises segments for holding the cells, and wherein the monitoring principle is based on the loading information.

9. A traffic shaper for a network, comprising:
an input device for receiving cells from a traffic source;
a buffering device, coupled to the input, for holding the cells until instructed to send the cells, wherein the buffering device further comprises a buffer and a transmission unit, the buffer holding the cells and the transmission unit sending the cell forward according to the send time received from the calculation unit, and wherein the buffering device comprises segments for holding the cells, and wherein the monitoring principle is based on the loading information;
a calculation unit, operatively coupled to the buffer processor, for calculating a send time for sending cells held by the buffering device, wherein the calculation unit calculates the send time based upon a nominal bit rate, a maximum delay, the loading information provided by the monitoring unit and a monitoring principle, and wherein the calculation unit calculates a transmission interval between successive cells based on instantaneous bit rate at the arrival time of a $j_{th}$ cell, the nominal bit rate and the link rate; and
a monitoring unit for monitoring the input device and the buffering device to obtain loading information regarding the network.

10. The traffic shaper of claim 9 wherein the transmission interval between successive cells is calculated to:

$$N^*(j) = \frac{C_{link}}{IBR(j)}$$

where IBR(j) is the instantaneous bit rate of the $j_{th}$ cell, NBR is the nominal bit rate and $C_{link}$ is the link rate.

11. The traffic shaper of claim 10 wherein the calculating unit calculates a list of optimum transmission intervals for a plurality of priority levels and selects a final transmission interval based on the loading information such that $N_m(j)$ is equal to the largest N(k) smaller than or equal to $N^*(j)$, where $N_m(j)$ is the final transmission interval, N(k) is the transmission interval for priority level k, and $N^*(j)$ is the transmission interval for the $j_{th}$ cell.

12. The traffic shaper of claim 11 wherein the list of optimum transmission interval for each priority level k is calculated according to:

$$N(k) = Int\left(\frac{C_{link} \cdot 2^{k-4}}{\sqrt{2} \cdot NBR}\right) + 1.$$

13. The traffic shaper of claim 12 wherein the calculating unit further calculates a transmission interval $N_d(j)$ that takes into account the maximum delay according to:

$$N_d(j) = \min\left(int\left(\frac{C_{link} \cdot D_{max}}{X \cdot M(j)}\right), N_d(j-1)\right),$$

where X is the fixed cell size in bits, M(j) is the number of cells in the buffer at the arrival or $j^{th}$ cell, $D_{max}$ is the maximum delay and $C_{link}$ is the link rate.

14. The traffic shaper of claim 13 wherein the calculating unit selects the smaller of $N_m(j)$ and $N_d(j)$ as a send time and sends the send time to the transmission unit.

15. A network, comprising:
a traffic source for issuing cells;
an access node providing an interface to a SIMA network; and
a traffic shaper, functioning between the traffic source and the access node, the traffic shaper comprising:
   an input device for receiving cells from a traffic source;
   a buffering device, coupled to the input, for holding the cells until instructed to send the cells; and
   a calculation unit, operatively coupled to the buffer processor, for calculating a send time for sending cells held by the buffering device, wherein the send time optimizes a transmission interval between successive cells to obtain a maximum priority level, the transmission interval between successive cells being based on instantaneous bit rate at the arrival time of a $j_{th}$ cell, a nominal bit rate and a link rate.

16. The network of claim 15 wherein the buffering device further comprises a buffer and a transmission unit, the buffer holding the cells and the transmission unit sending the cell forward according to the send time received from the calculation unit.

17. The network of claim 16 further comprising a monitoring unit for monitoring the input device and the buffering device to obtain loading information regarding the network.

18. The network of claim 17 wherein the calculation unit calculates the send time based upon a nominal bit rate, a maximum delay, the loading information provided by the monitoring unit and a monitoring principle.

19. The network of claim 18 wherein the buffer comprises segments for holding the cells, and wherein the monitoring principle is based solely upon a number of segments containing cells in the buffer.

20. The network of claim 19 wherein the calculation unit determines a transmission rate for sending the cells, the transmission rate being equal to:

$$\frac{\sqrt{2}\, NBR}{2^{k-4}}$$

where k is the number of a segment up to which the buffer is filled and NBR is the nominal bit rate.

21. The network of claim 20 wherein the maximum delay is:

$$D^*_{\max}(y) = \frac{X \cdot \sum_{k=0}^{7} y(k) \cdot N(k)}{C_{link}},$$

where y is the number of cells in a segment, $C_{link}$ is the link rate, k is the number of a segment up to which the buffer is filled and N(k) is the priority level, and wherein $D^*_{max}(y) \leq D_{max}$.

22. The network of claim 18 wherein the buffer comprises segments for holding the cells, and wherein the monitoring principle is based on the loading information.

23. A network comprising:
a traffic source for issuing cells;
an access node providing an interface to a SIMA network; and
a traffic shaper, functioning between the traffic source and the access node, the traffic shaper comprising:
   an input device for receiving cells from a traffic source;
   a buffering device, coupled to the input, for holding the cells until instructed to send the cells, wherein the buffering device further comprises a buffer and a transmission unit, the buffer holding the cells and the transmission unit sending the cell forward according to the send time received from the calculation unit, wherein the buffering device further comprises segments for holding the cells, and wherein the monitoring principle is based on the loading information;
   a calculation unit, operatively coupled to the buffer processor, for calculating a send time for sending cells held by the buffering device, wherein the calculation unit calculates the send time based upon a nominal bit rate, a maximum delay, the loading information provided by the monitoring unit and a monitoring principle, wherein the calculation unit calculates a transmission interval between successive cells based on instantaneous bit rate at the arrival time of a $j_{th}$ cell, the nominal bit rate and the link rate; and
   a monitoring unit for monitoring the input device and the buffering device to obtain loading information regarding the network.

24. The network of claim 23 wherein the transmission interval between successive cells is calculated according to:

$$N^*(j) = \frac{C_{link}}{IBR(j)}$$

where IBR(j) is the instantaneous bit rate of the $j_{th}$ cell, NBR is the nominal bit rate and $C_{link}$ is the link rate.

25. The network of claim 24 wherein the calculating unit calculates a list of optimum transmission intervals for a plurality of priority levels and selects a final transmission interval based on the loading information such that $N_m(j)$ is equal to the largest N(k) smaller than or equal to $N^*(j)$, where $N_m(j)$ is the final transmission interval, N(k) is the transmission interval for priority level k, and $N^*(j)$ is the transmission interval for the $j_{th}$ cell.

26. The network of claim 25 wherein the list of optimum transmission interval for each priority level k is calculated according to:

$$N(k) = Int\left(\frac{C_{link} \cdot 2^{k-4}}{\sqrt{2} \cdot NBR}\right) + 1.$$

27. The network of claim 26 wherein the calculating unit further calculates a transmission interval $N_d(j)$ that takes into account the maximum delay according to:

$$N_d(j) = \min\left(int\left(\frac{C_{link} \cdot D_{\max}}{X \cdot M(j)}\right), N_d(j-1)\right),$$

where X is the fixed cell size in bits, M(j) is the number of cells in the buffer at the arrival or $j^{th}$ cell, $D_{max}$ is the maximum delay and $C_{link}$ is the link rate.

28. The network of claim 27 wherein the calculating unit selects the smaller of $N_m(j)$ and $N_d(j)$ as a send time and sends the send time to the transmission unit.

29. A method of shaping traffic between a traffic source and an access node to a SIMA network, comprising the steps of:
receiving data cells at an input device;
loading the cells into a buffer,
obtaining information regarding the loading of the network via a monitoring device;
calculating a send time of a next cell at a calculation unit based upon a nominal bit rate, a maximum delay and a monitoring principle, wherein the send time optimizes a transmission interval between successive cells to obtain a maximum priority level, the transmission interval between successive cells being based on instantaneous bit rate at the arrival time of a $j_{th}$ cell, a nominal bit rate and a link rate.

30. The method of claim 29 wherein the monitoring principle is based solely on a buffer occupancy level.

31. The method of claim 30 wherein the step of calculating further comprises the step of determining a transmission rate for sending the cells, the transmission rate being equal to:

$$\frac{\sqrt{2}\, NBR}{2^{k-4}}$$

where k is the number of a segment up to which the buffer is filled and NBR is the nominal bit rate.

32. The method of claim 31 wherein the step of calculating further comprises the step of calculating a maximum delay according to:

$$D^*_{max}(y) = \frac{X \cdot \sum_{k=0}^{7} y(k) \cdot N(k)}{C_{link}},$$

where y is the number of cells in a segment, $C_{link}$ is the link rate, k is the number of a segment up to which the buffer is filled and N(k) is the priority level, and wherein $D^*_{max}(y) \leq D_{max}$.

33. The method of claim 29 wherein the monitoring principle is based on a load measurement result.

34. A method of shaping traffic between a traffic source and an access node to a SIMA network, comprising the steps of:
  receiving data cells at an input device;
  loading the cells into a buffer;
  obtaining information regarding the loading of the network via a monitoring device;
  calculating a send time of a next cell at a calculation unit based upon a nominal bit rate, a maximum delay and a monitoring principle, wherein the monitoring principle is based on a load measurement result and wherein the step of calculating further comprises the step of calculating a transmission interval between successive cells based on instantaneous bit rate at the arrival time of a $j_{th}$ cell, the nominal bit rate and the link rate.

35. The method of claim 34 wherein the step of calculating a transmission interval between successive cells further comprises the step of calculating the transmission interval between successive cells according to:

$$N^*(j) = \frac{C_{link}}{IBR(j)}$$

where IBR(j) is the instantaneous bit rate of the $j_{th}$ cell, NBR is the nominal bit rate and $C_{link}$ is the link rate.

36. The method of claim 35 wherein the step of calculating further comprises the steps of calculating a list of optimum transmission intervals for a plurality of priority levels and selecting a final transmission interval based on the loading information such that $N_m(j)$ is equal to the largest N(k) smaller than or equal to $N^*(j)$, where $N_m(j)$ is the final transmission interval, N(k) is the transmission interval for priority level k, and $N^*(j)$ is the transmission interval for the $j_{th}$ cell.

37. The method of claim 36 wherein the step of calculating the list of optimum transmission interval for each priority level k further comprises the step of calculating an optimum transmission interval for priority level k according to:

$$N(k) = Int\left(\frac{C_{link} \cdot 2^{k-4}}{\sqrt{2} \cdot NBR}\right) + 1.$$

38. The method of claim 37 wherein the step of calculating further comprises the step of calculating a transmission interval $N_d(j)$ that takes into account the maximum delay according to:

$$N_d(j) = \min\left(int\left(\frac{C_{link} \cdot D_{max}}{X \cdot M(j)}\right), N_d(j-1)\right),$$

where X is the fixed cell size in bits, M(j) is the number of cells in the buffer at the arrival or $j^{th}$ cell, $D_{max}$ is the maximum delay and $C_{link}$ is the link rate.

39. The method of claim 38 wherein the step of calculating further comprises the steps of selecting the smaller of $N_m(j)$ and $N_d(j)$ as a send time and sending the send time to cause transmission of the next cell.

* * * * *

UNITED STATES PATENT AND TRADEMARK OFFICE
CERTIFICATE OF CORRECTION

PATENT NO.     : 6,549,514 B1
DATED          : April 15, 2003
INVENTOR(S)    : Kalevi Kilkki et al.

It is certified that error appears in the above-identified patent and that said Letters Patent is hereby corrected as shown below:

<u>Title page, Item [54] and Column 1, line 2,</u>
Title of the Invention, please delete "TRAFFICE" and replace it with -- TRAFFIC --.

Signed and Sealed this

Twenty-sixth Day of August, 2003

JAMES E. ROGAN
*Director of the United States Patent and Trademark Office*